US009488271B2

(12) United States Patent
Aoki et al.

(10) Patent No.: US 9,488,271 B2
(45) Date of Patent: Nov. 8, 2016

(54) CONTROL DEVICE FOR BELT-TYPE CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Daisuke Aoki, Ebina (JP); Takahiro Kobayashi, Isehara (JP); Seiichiro Takahashi, Isehara (JP); Yuta Suzuki, Sagamihara (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/779,521

(22) PCT Filed: Nov. 28, 2013

(86) PCT No.: PCT/JP2013/082001
§ 371 (c)(1),
(2) Date: Sep. 23, 2015

(87) PCT Pub. No.: WO2014/155832
PCT Pub. Date: Oct. 2, 2014

(65) Prior Publication Data
US 2016/0047470 A1 Feb. 18, 2016

(30) Foreign Application Priority Data

Mar. 27, 2013 (JP) .................................. 2013-066588

(51) Int. Cl.
*F16H 61/662* (2006.01)
*F16G 1/22* (2006.01)
*F16H 9/18* (2006.01)

(52) U.S. Cl.
CPC ........... *F16H 61/66272* (2013.01); *F16G 1/22* (2013.01); *F16H 9/18* (2013.01); *F16H 2061/66277* (2013.01)

(58) Field of Classification Search
None
See application file for complete search history.

(56) References Cited

U.S. PATENT DOCUMENTS 5,063,815 A * 11/1991 Oshidari ............. F16H 37/0846
477/38

(Continued)

FOREIGN PATENT DOCUMENTS

| JP | H03-103658 A | 4/1991 |
|---|---|---|
| JP | 2004-036802 A | 2/2004 |
| JP | 2008-274972 A | 11/2008 |

*Primary Examiner* — Edwin A Young
(74) *Attorney, Agent, or Firm* — Foley & Lardner LLP (57) ABSTRACT

A control device for a belt-type continuously variable transmission CVT includes an engine 1, a belt-type continuously-variable transmitting mechanism 4; a forward/reverse switching mechanism 3 including a forward clutch 31 and a reverse brake 32; and a hydraulic control circuit 71 configured to control a pulley hydraulic pressure and engagement-element pressures for the forward clutch 31 and the reverse brake 32. The control device includes a selection control means for outputting a pulley hydraulic command to obtain an idle-time clamping pressure which is higher than an idle-time minimum pressure (idle-time MIN-pressure) calculated from an input torque, to the hydraulic control circuit 71, when the engine 1 is in operation during a selection of N-range. A position of an element clearance generated in the belt can be maintained even if drag torque is inputted.

4 Claims, 6 Drawing Sheets

(56) References Cited

U.S. PATENT DOCUMENTS

2004/0171445 A1* 9/2004 Yamamoto ........ F16H 61/66259
 474/28

2008/0269012 A1* 10/2008 Tanaka .................. F16H 61/061
 477/45
2012/0322613 A1* 12/2012 Suzuki .................... F16H 61/16
 477/41

* cited by examiner

CONTROL DEVICE FOR BELT-TYPE CONTINUOUSLY VARIABLE TRANSMISSION

TECHNICAL FIELD

The present invention relates to a control device for a belt-type continuously variable transmission in which a belt constituted by stacking multiple elements in an annular shape is wound on sheave surfaces of primary and secondary pulleys.

BACKGROUND ART

Conventionally, a line-pressure control device for an automatic transmission is known in which a line-pressure control for bringing a line pressure to a higher level than a normal line pressure set according to a throttle opening, when a selecting manipulation D→N→R or a selecting manipulation R→N→D is conducted while a drive load of the transmission is larger than or equal to a predetermined load (for example, see Patent Literature 1).

However, the line-pressure control device for an automatic transmission which is disclosed in Patent Literature 1 performs a normal line-pressure control until the selecting manipulation D→N→R or the selecting manipulation R→N→D is detected. Hence, in a case that this line-pressure control is applied to a belt-type continuously variable transmission, the line pressure is used as a minimum necessary hydraulic pressure under N-range (non-running range). Therefore, if a drag torque is inputted during the selection of N-range, an element clearance (backlash) is moved. In this case, there is a problem that an desired performance is attained when a selection control for inhibiting a backlash shock from occurring due to belt counterturn is performed based on a recognition that the backlash exists in an expected direction.

It is noted that the "backlash shock" is a shock of longitudinal acceleration (front-rear acceleration) G which is caused because the element clearance(s) of the belt is vigorously filled with a collision between the elements when the selecting manipulation accompanied by the counterturn of rotational direction of the belt is conducted.

CITATION LIST

Patent Literature

Patent Literature 1: Japanese Patent Application Publication No. H03-103658

SUMMARY OF THE INVENTION

It is an object of the present invention to provide a control device for a belt-type continuously variable transmission, devised to maintain a position of the element clearance (backlash) caused in the belt, even if drag torque is inputted when a drive source is in operation during the selection of non-running range (N-range).

A control device for a belt-type continuously variable transmission according to the present invention includes a drive source, a belt-type continuously-variable transmitting mechanism, a forward/reverse switching mechanism, a hydraulic control circuit, and a selection control means. The belt-type continuously-variable transmitting mechanism includes a primary pulley, a secondary pulley, and a belt wound on sheave surfaces of both the primary and secondary pulleys and formed by stacking multiple elements in an annular shape. The forward/reverse switching mechanism is provided between the drive source and the belt-type continuously-variable transmitting mechanism, configured to switch a transmission-input rotational direction by engaging a forward-side friction engagement element when a range position is a forward running range and by engaging a reverse-side friction engagement element when the range position is a reverse running range, and configured to release both the friction engagement elements when the range position is a non-running range. The hydraulic control circuit controls pulley hydraulic pressures for the primary pulley and the secondary pulley and engagement-element pressures for the forward-side friction engagement element and the reverse-side friction engagement element. The selection control means outputs a pulley hydraulic command to obtain an idle-time clamping pressure which is higher than an idle-time minimum pressure calculated from an input torque, to the hydraulic control circuit, when the drive source is in operation during a selection of the non-running range.

Accordingly, when the drive source is in operation during the selection of non-running range, the pulley hydraulic command to obtain the idle-time clamping pressure which is higher than the idle-time minimum pressure calculated from the input torque is outputted to the hydraulic control circuit.

The following was discovered by the inventors of the present application. For example, when a selecting manipulation from the running range to the non-running range is conducted while the drive source is in operation, both the friction engagement elements included in the forward/reverse switching mechanism are released. However, at this time, some friction contact surfaces which are a part of plate friction surfaces of each friction engagement element and which are not completely separated off and thereby remain in contact with each other are unavoidably present. Hence, the drag torque is generated.

This drag torque during the selection of non-running range is inputted into the belt-type continuously-variable transmitting mechanism. At this time, if a belt clamping force of the secondary pulley is small, the elements of the belt move due to the inputted drag torque. This movement of the elements due to the drag torque varies the element clearance (backlash). Hence, even if the selection control is performed based on a recognition that the backlash exists in an expected position, a desired performance is not attained.

Contrarily, the pulley hydraulic pressure is set to be equal to the idle-time clamping pressure which is higher than the idle-time minimum pressure, when the drive source is in operation during the selection of non-running range. Hence, the clamping force for the belt by the secondary pulley is secured. Accordingly, the elements of the belt are inhibited from moving in dependence upon magnitude and direction of the drag torque inputted during the selection of non-running range.

As a result, the position of the element clearance (backlash) generated in the belt can be maintained even if the drag torque is inputted, when the drive source is in operation during the selection of non-running range (N-range).

DETAILED EXPLANATION OF THE INVENTION

Hereinafter, best mode of carrying out a control device for a belt-type continuously variable transmission according to the present invention will be explained based on a first embodiment shown in the drawings.

First Embodiment

At first, a configuration will now be explained.

A configuration of the control device for a belt-type continuously variable transmission CVT in the first embodiment is divided into an "overall system configuration" and a "selection-control configuration" for explanations.

[Overall system configuration]

Figure 1:
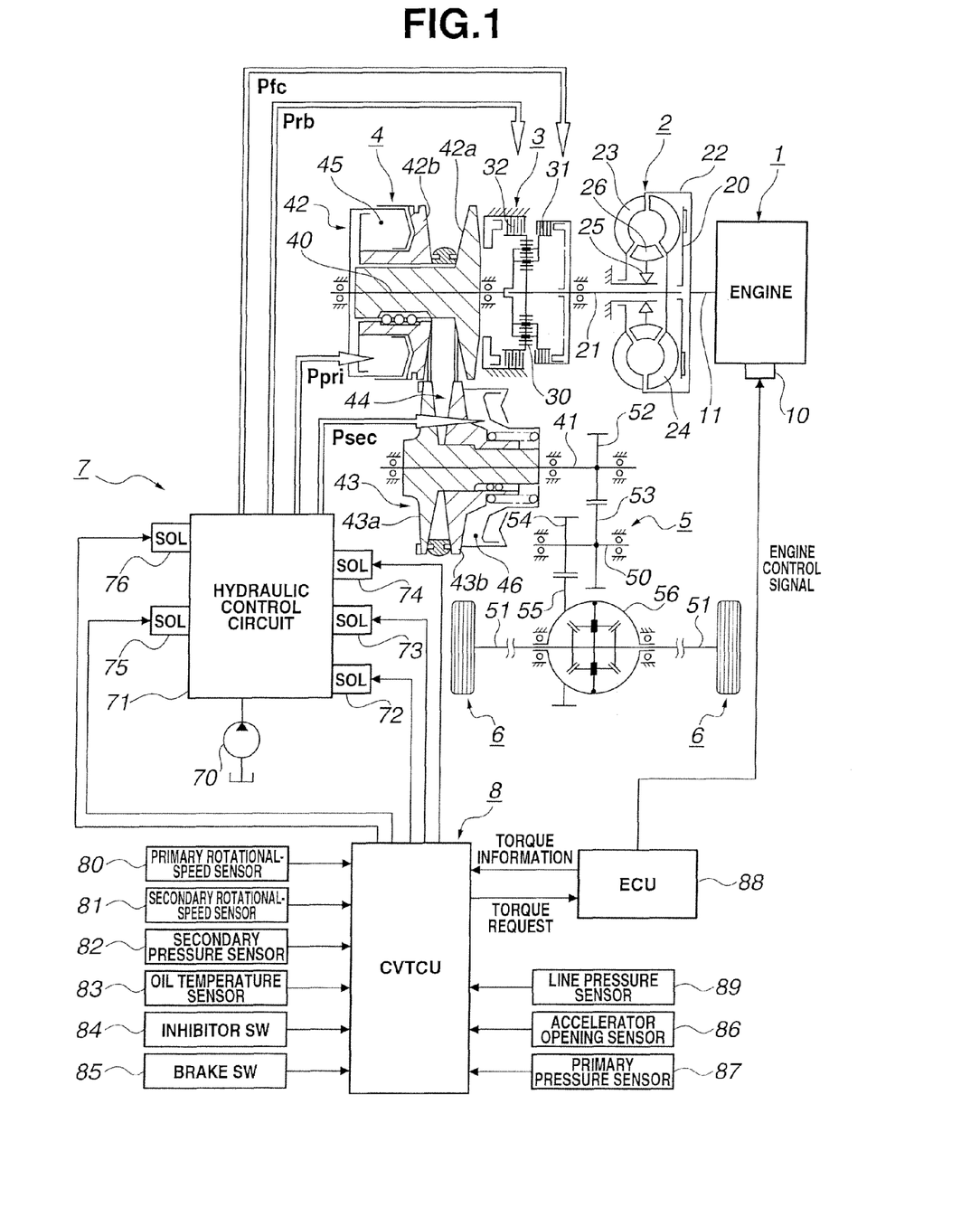
FIG. 1 An overall system diagram showing drive system and control system of an engine vehicle to which a control device for a belt-type continuously variable transmission in a first embodiment is applied.
Figure 2:
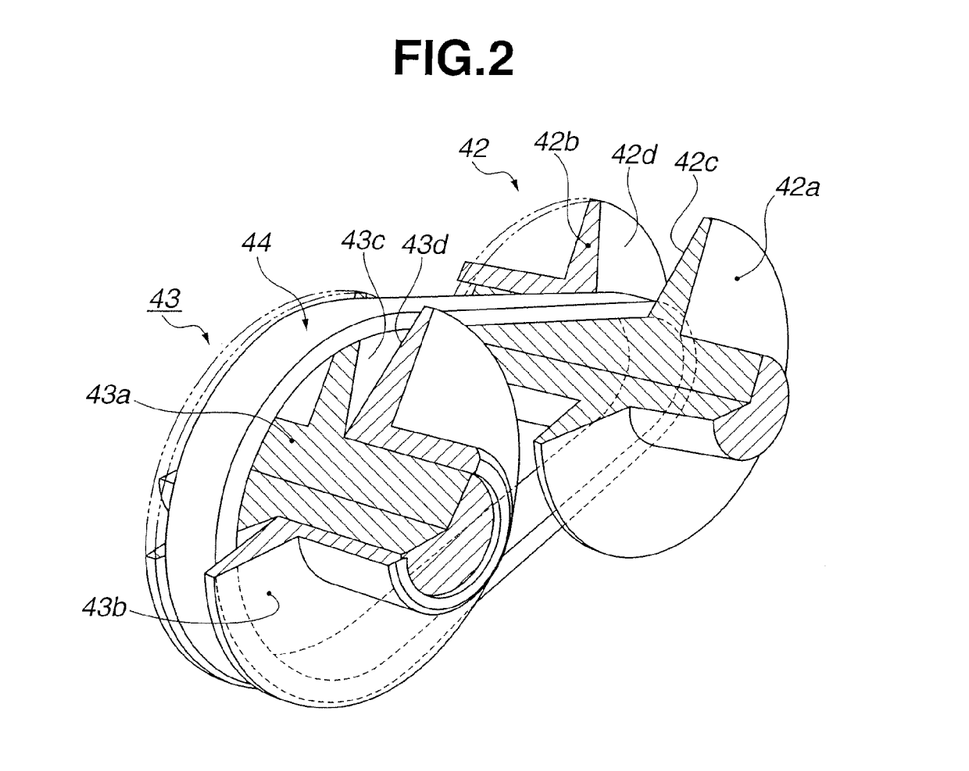
FIG. 2 An oblique perspective view showing a belt-type continuously-variable transmitting mechanism provided in the drive system of the engine vehicle to which the control device in the first embodiment is applied.
Figure 3:
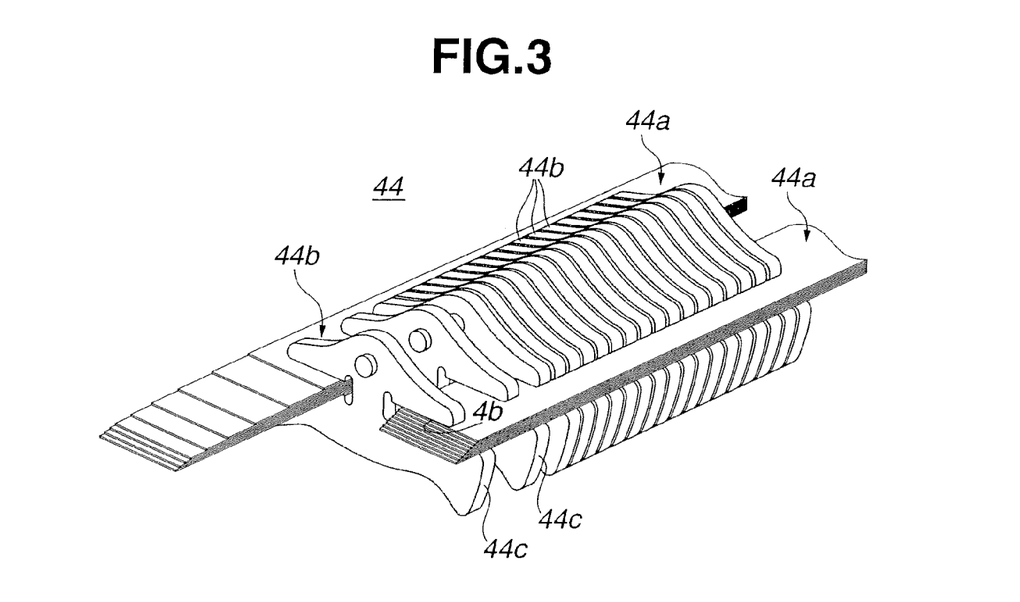
FIG. 3 An oblique perspective view showing a part of a belt which constitutes the belt-type continuously-variable transmitting mechanism provided in the drive system of the engine vehicle to which the control device in the first embodiment is applied.

FIG. 1 shows drive system and control system of an engine vehicle to which the control device for the belt-type continuously variable transmission in the first embodiment has been applied. FIGS. 2 and 3 show a belt-type continuously-variable transmitting mechanism. The overall system configuration will now be explained referring to FIGS. 1 to 3.

As shown in FIG. 1, the drive system of the engine vehicle includes an engine 1, a torque converter 2, a forward/reverse switching mechanism 3, the belt-type continuously-variable transmitting mechanism 4, a final reduction gear mechanism 5, and drive wheels 6 and 6. It is noted that the belt-type continuously variable transmission CVT is constituted by the torque converter 2, the forward/reverse switching mechanism 3, the belt-type continuously-variable transmitting mechanism 4 and the final reduction gear mechanism 5 which are accommodated in a transmission case.

An output torque of the engine 1 can be controlled not only by an accelerator manipulation by a driver, but also by engine control signals derived from its external. The engine 1 includes an output-torque control actuator 10 for controlling the output torque by an opening-and-closing operation of a throttle valve, a fuel-cut operation and the like.

The torque converter 2 is a moving-start element having a torque-increase function. The torque converter 2 includes a lockup clutch 20 which can directly connect an engine output shaft 11 (=a torque-converter input shaft) with a torque-converter output shaft 21 when the torque-increase function is not necessary. The torque converter 2 includes a turbine runner 23 connected through a converter housing 22 with the engine output shaft 11, a pump impeller 24 connected with the torque-converter output shaft 21, and a stator 26 attached to a case through a one-way clutch 25.

The forward/reverse switching mechanism 3 is a mechanism for switching an input rotational direction of the belt-type continuously-variable transmitting mechanism 4 between a positive-rotational direction at the time of forward running and a reverse-rotational direction at the time of reverse running. The forward/reverse switching mechanism 3 includes a double-pinion-type planetary gear set 30, a forward clutch (a forward-side friction engagement element) 31 and a reverse brake (a reverse-side friction engagement element) 32. The forward clutch 31 is constituted by a plurality of clutch plates, and the reverse brake 32 is constituted by a plurality of brake plates. The forward clutch 31 is engaged by a forward clutch pressure Pfc when a forward running range such as a D-range (DRIVE mode) is selected. The reverse brake 32 is engaged by a reverse brake pressure Prb when an R-range (REVERSE mode) which is a reverse running range is selected. It is noted that both of the forward clutch 31 and the reverse brake 32 are released by draining the forward clutch pressure Pfc and the reverse brake pressure Prb when an N-range (NEUTRAL mode, non-running range) is selected.

The belt-type continuously-variable transmitting mechanism 4 has a continuously-variable transmitting function (stepless shifting function) that continuously varies a speed ratio (i.e., pulley ratio) between a transmission input rotational speed and a transmission output rotational speed by means of variation of a belt contact radius. The belt-type continuously-variable transmitting mechanism 4 includes a primary pulley 42, a secondary pulley 43 and a belt 44. As shown in FIG. 2, the primary pulley 42 includes a fixed pulley 42a and a slide pulley 42b. The slide pulley 42b slides by a primary pressure Pri introduced into a primary-pressure chamber 45. As shown in FIG. 2, the secondary pulley 43 includes a fixed pulley 43a and a slide pulley 43b. The slide pulley 43b slides by a secondary pressure Psec introduced into a secondary-pressure chamber 46. As shown in FIG. 2, sheave surfaces 42c and 42d form a V-shape groove of the primary pulley 42 whereas sheave surfaces 43c and 43d form a V-shape groove of the secondary pulley 43. The belt 44 is wound around (hung on) the sheave surfaces 42c and 42d and the sheave surfaces 43c and 43d. As shown in FIG. 3, the belt 44 includes two sets of laminated rings 44a and 44a, and multiple elements 44b. Each of the laminated rings 44a and 44a is formed by a lamination of multiple annular rings from inside to outside thereof. Each of the multiple elements 44b is made of a punched plate material. Each of the multiple elements 44b sandwiches the two sets of laminated rings 44a and 44a. Thereby, the multiple elements 44b are attached such that the multiple elements 44b are stacked in an annular shape along the two sets of laminated rings 44a and 44a. Each of the multiple elements 44b includes flank surfaces 44c and 44c at both sides of the element 44b. The flank surfaces 44c and 44c respectively become in contact with the sheave surfaces 42c and 42d of the primary pulley 42 and the sheave surfaces 43c and 43d of the secondary pulley 43.

The final reduction gear mechanism 5 reduces a transmission output speed derived from a transmission output shaft 41 of the belt-type continuously-variable transmitting mechanism 4, and applies a differential function to the reduced transmission output speed so as to transfer this output speed to the left and right drive wheels 6 and 6. The final reduction gear mechanism 5 includes a first gear 52, a second gear 53, a third gear 54, a fourth gear 55 and a differential gear 56 which are interposed among the transmission output shaft 41, an idler shaft 50, and left and right drive shafts 51 and 51. The first gear 52, the second gear 53, the third gear 54 and the fourth gear 55 have a speed-reduction function. The differential gear 56 has the differential function.

As shown in FIG. 1, the control system of the engine vehicle includes a hydraulic control unit 7 and a CVT control unit 8.

The hydraulic control unit 7 produces the primary pressure Ppri that is introduced into the primary-pressure chamber 45, the secondary pressure Psec that is introduced into the secondary-pressure chamber 46, the forward clutch pressure Pfc that is applied to the forward clutch 31, and the reverse brake pressure Prb that is applied to the reverse brake 32. The hydraulic control unit 7 includes an oil pump 70 and a hydraulic control circuit 71. The hydraulic control circuit 71 includes a line pressure solenoid 72, a primary pressure solenoid 73, a secondary pressure solenoid 74, a forward-clutch pressure solenoid 75 and a reverse-brake pressure solenoid 76.

According to a line-pressure command derived from the CVT control unit 8, the line pressure solenoid 72 adjusts a line pressure PL to a commanded level by use of working oil pumped by the oil pump 70.

According to a primary-pressure command derived from the CVT control unit 8, the primary pressure solenoid 73 adjusts the primary pressure Ppri to its commanded level by reducing the line pressure PL given as a base pressure.

According to a secondary-pressure command derived from the CVT control unit 8, the secondary pressure solenoid 74 adjusts the secondary pressure Psec to its commanded level by reducing the line pressure PL given as the base pressure.

According to a forward-clutch-pressure command derived from the CVT control unit 8, the forward-clutch pressure solenoid 75 adjusts the forward clutch pressure Pfc to its commanded level by reducing the line pressure PL given as the base pressure.

According to a reverse-brake-pressure command derived from the CVT control unit 8, the reverse-brake pressure solenoid 76 adjusts the reverse brake pressure Prb to its commanded level by reducing the line pressure PL given as the base pressure.

The CVT control unit 8 performs a line-pressure control, a shift hydraulic control, a forward/reverse switching control, and the like. In the line-pressure control, a command to obtain (realize) a target line pressure according to a throttle opening or the like is outputted to the line pressure solenoid 72. In the shift hydraulic control, a command to obtain a target speed ratio (pulley ratio) according to a vehicle speed and the throttle opening or the like is outputted to the primary pressure solenoid 73 and the secondary pressure solenoid 74. In the forward/reverse switching control, a command to control engagement/disengagement of the forward clutch 31 and the reverse brake 32 is outputted to the forward-clutch pressure solenoid 75 and the reverse-brake pressure solenoid 76. The CVT control unit 8 receives sensor/switch information derived from a primary rotational-speed sensor 80, a secondary rotational-speed sensor 81, a secondary pressure sensor 82, an oil temperature sensor 83, an inhibitor switch 84, a brake switch 85, an accelerator opening sensor 86, a primary pressure sensor 87, a line pressure sensor 89 and the like. Moreover, the CVT control unit 8 receives torque information from an engine control unit 88, and outputs a torque request to the engine control unit 88. The inhibitor switch 84 detects a selected range position (such as D-range, N-range, R-range), and outputs a range-position signal corresponding to the detected range position

[Selection-control configuration]

Figure 4:
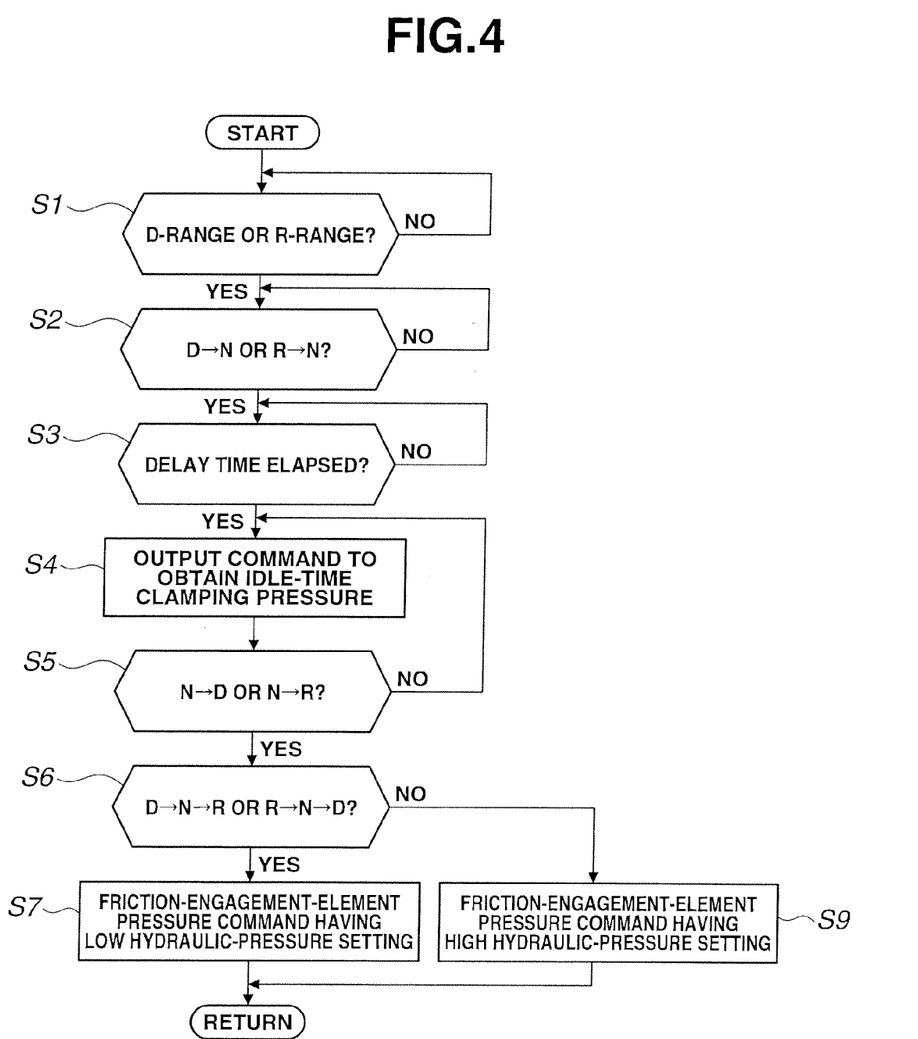
FIG. 4 A flowchart showing a processing flow of a selection control which is executed by a CVT control unit in the control device in the first embodiment.

FIG. 4 is a flowchart showing a processing flow of a selection control which is executed by the CVT control unit 8 in the first embodiment. The respective steps (selection control means) of FIG. 4 which represent a configuration of the selection control will now be explained.

At step S1, this processing starts when an ignition key is turned on. At this time, it is judged whether or not a currently-selected range position is the running range which is D-range or R-range. In the case of YES (D-range or R-range), the program proceeds to step S2. In the case of NO (other than D-range and R-range), the judging process of step S1 is repeated.

At step S2 subsequent to the determination of D-range or R-range at step S1, it is judged whether or not a selecting manipulation from D-range to N-range has been conducted, and also, it is judged whether or not a selecting manipulation from R-range to N-range has been conducted. In the case of YES (D→N or R→N), the program proceeds to step S3. In the case of NO (no selecting manipulation to N-range), the judging process of step S2 is repeated.

At step S3 subsequent to the determination of D →N or R→N at step S2, it is judged whether or not a predetermined delay time has already elapsed. If the predetermined delay time has elapsed (YES), the program proceeds to step S4. If the predetermined delay time has not yet elapsed (NO), the judging process of step S3 is to repeated.

It is noted that the predetermined delay time is a time length necessary to complete a drainage of hydraulic pressure. That is, a time length necessary to bring the forward clutch pressure Pfc to a drained state from a time point at which the selecting manipulation from D-range to N-range (D→N) is conducted is measured. Moreover, a time length necessary to bring the reverse brake pressure Prb to a drained state from a time point at which the selecting manipulation from R-range to N-range (R→N) is conducted is measured. Based on these measured values, the predetermined delay time is set.

At step S4 subsequent to the determination of elapse of the delay time at step S3 or subsequent to the determination of no selecting manipulation to the running range at step S5, a pulley hydraulic command to obtain an idle-time clamping pressure which is higher than an idle-time minimum necessary pressure (=idle-time MIN-pressure) calculated from an input torque is outputted to the hydraulic control circuit 71. Then, the program proceeds to step S5.

It is noted that the "idle-time clamping pressure" is set such that a belt-clamping force (the secondary pressure Psec=the idle-time clamping pressure) for holding the elements 44b of the belt 44 on the sheave surfaces 43c and 43d of the secondary pulley 43 is greater than a drag torque which is caused by the forward clutch 31 and the reverse brake 32 in the forward/reverse switching mechanism 3. Moreover, when the pulley hydraulic command is outputted, specifically, not only a secondary-pressure command to increase the secondary pressure Psec up to the idle-time clamping pressure, but also a line-pressure command to increase the line pressure PL up to a level higher than or equal to the idle-time clamping pressure are outputted.

At step S5 subsequent to the output of the command to obtain the idle-time clamping pressure at step S4, it is judged whether or not a selecting manipulation from N-range to D-range has been conducted, and also, it is judged whether or not a selecting manipulation from N-range to R-range has been conducted. In the case of YES (N→D or N→R), the program proceeds to step S6. In the case of NO (no selecting manipulation to the running range), the program returns to step S4.

At step S6 subsequent to the determination of N→D or N→R at step S5, it is judged whether or not a selecting manipulation D→N→R or R→N→D which has different (opposite) running ranges before and after N-range has been conducted. In the case of YES (D→N→R or R→N→D), the program proceeds to step S7. In the case of NO (D→N→D or R→N→R), the program returns to step S8.

At step S7 subsequent to the determination of the selecting manipulation D→N→R or R→N→D, a rise-rate suppressing control for causing a rise rate of an engaging hydraulic pressure to be low by a friction-engagement-element pressure command having a low hydraulic-pressure setting is executed. Then, the program proceeds to RETURN.

That is, in the case of the selecting manipulation D→N→R, the clutch-pressure command for the reverse brake 32 is produced by a low hydraulic-pressure setting as compared with the case of the selecting manipulation R→N→R. Similarly, in the case of the selecting manipulation R→N→D, the clutch-pressure command for the forward clutch 31 is produced by a low hydraulic-pressure setting as compared with the case of the selecting manipulation D→N→D. Moreover, the clutch-pressure command is set such that a lag time between the selecting manipulation to R-range or D-range and an occurrence of backlash (play) shock in the case of the selecting manipulation D→N→R or R→N→D is approximately equal to a lag time between the selecting manipulation to the running range and an occurrence of engagement shock in the case of the selecting manipulation having identical (directional) running ranges before and after N-range. It is noted that the secondary-pressure command is switched from the command to obtain the idle-time clamping pressure to a command to obtain the secondary pressure Psec calculated from the input torque, when it is determined that the selecting manipulation D→N→R or R→N→D has been conducted. At this time, also the line-pressure command is switched from the command to secure the idle-time clamping pressure to a command to obtain the line pressure PL according to the input torque.

At step S8 subsequent to the determination of the selecting manipulation having identical running ranges before and after N-range at step S6, an engaging control for causing the rise rate of the engaging hydraulic pressure to be a normal rate by a friction-engagement-element pressure command having a high hydraulic-pressure setting is executed. Then, the program proceeds to RETURN.

That is, in the case of the selecting manipulation D→N→D, the clutch-pressure command for the forward clutch 31 is produced by a high hydraulic-pressure setting as compared with the case of the selecting manipulation R→N→D. Similarly, in the case of the selecting manipulation R→N→R, the clutch-pressure command for the reverse brake 32 is produced by a high hydraulic-pressure setting as compared with the case of the selecting manipulation D→N→R. It is noted that the secondary-pressure command is switched from the command to obtain the idle-time clamping pressure to the command to obtain the secondary pressure Psec calculated from the input torque, when it is determined that the selecting manipulation D→N→D or R→N→R has been conducted. At this time, also the line-pressure command is switched from the command to secure the idle-time clamping pressure to the command to obtain the line pressure PL according to the input torque.

Next, operations will be explained.

Operations in the control device for the belt-type continuously variable transmission CVT according to the first embodiment are divided into "generating mechanism of backlash shock", "problems in comparative example", "selection control operations at the time of running range→non-running range", and "selection control operations at the time of running range→non-running range→running range" for explanations.

[Generating mechanism of Backlash shock]

Figure 5A:
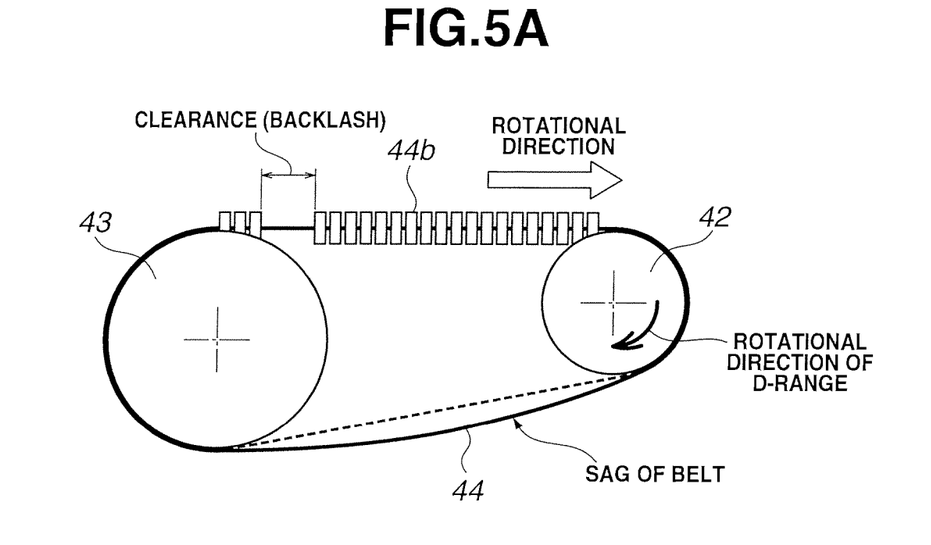
FIG. 5A A before-counterturn explanatory view showing a generating mechanism of backlash shock in a selection mode in which a rotational direction of the belt is inversely changed in the belt-type continuously-variable transmitting mechanism in the first embodiment.
Figure 5B:
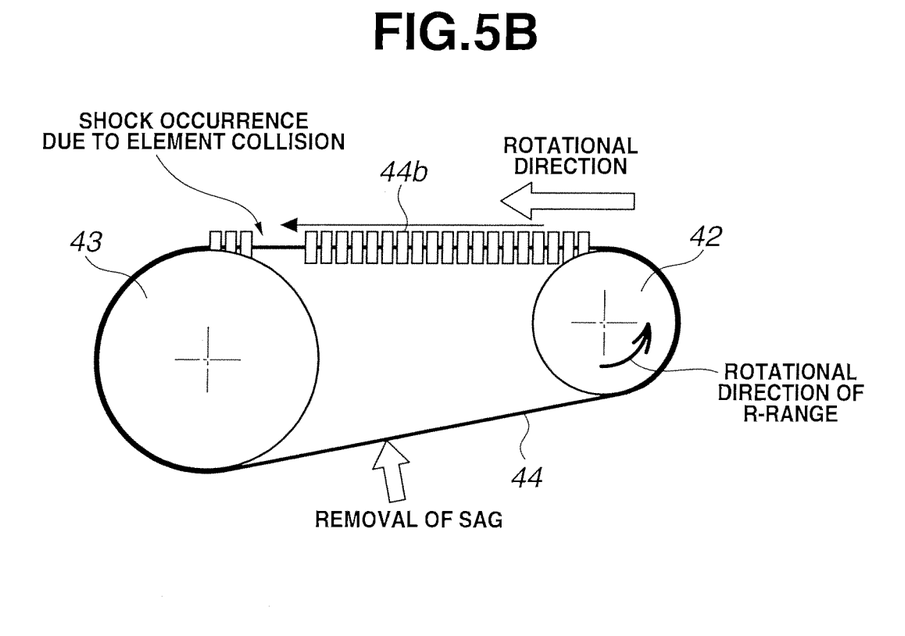
FIG. 5B An after-counterturn explanatory view showing the generating mechanism of backlash shock in the selection mode in which the rotational direction of the belt is inversely changed in the belt-type continuously-variable transmitting mechanism in the first embodiment.

A generating mechanism of the backlash shock due to rotation counterturn will now be explained referring to FIGS. 5A and 5B.

For example, when the belt 44 rotates with the rotations of the pulleys 42 and 43 under D-range, a clearance is caused between the elements 44b due to a change of tension of the belt 44. As shown in FIG. 5A, with respect to a rotational circumferential direction of the belt 44, the clearance (backlash) of the elements 44b is, in particular, largely caused at a location which is in a region from the secondary pulley 43 to the primary pulley 42 and which is closer to the secondary pulley 43. At this time, the belt 44 sags (deflects) in a region from the primary pulley 42 to the secondary pulley 43.

The sag and the clearance between the elements 44b remain as-is when the vehicle stops so that the rotation of the belt 44 is stopped. Then, if the belt 44 rotates in a direction (rotational direction of R-range) opposite to the rotational direction of D-range (before-stop rotational direction) when the vehicle starts to move again, force is applied in a direction that fills the clearance. As shown in FIG. 5B, when torque is applied to the primary pulley 42 in the opposite rotational direction, the primary pulley 42 rotates by an elimination amount of the sag caused by the condition of FIG. 5A. By this rotation of the primary pulley 42, the clearance between the elements 44b is vigorously removed, so that the elements 44b collide with each other to generate a shock (=the backlash shock). This backlash shock is larger as the input torque at the time of restart of vehicle movement becomes larger, because the clearance is removed in a shorter time as the input torque becomes larger.

The above-explanation is the generating mechanism of the backlash shock due to the belt counterturn in the case of selecting manipulation D→N→R. It is noted that the generating mechanism of the backlash shock due to the belt counterturn in the case of selecting manipulation R→N→D is the same as the case of selecting manipulation D→N→R only except that the clearance (backlash) of the elements 44b and the sag of the belt 44 are inversely caused in the upper and lower regions between the primary pulley 42 and the secondary pulley 43.

[Problems in Comparative example]

A comparative example in which the secondary pressure Psec is set at a necessary pressure (the idle-time minimum pressure) calculated from the input torque under N-range will now be given.

When the vehicle is in a stopped state under N-range before the vehicle starts to move again in the case of the selecting manipulation D→N→R or the selecting manipulation R→N→D, the secondary pulley 43 is in a stopped state. However, drag torque of the forward clutch 31 and the reverse brake 32 is inputted from the primary pulley 41 even under N-range. Hence, the belt 44 slips on the sheave surfaces 43c and 43d of the secondary pulley 43 by the input of drag torque from the primary pulley 42. That is, the forward clutch 31 and the reverse brake 32 of the forward/reverse switching mechanism 3 are released when the selecting manipulation from the running range (D-range, R-range) to the non-running range (N-range) is conducted. However, even after the forward clutch 31 and the reverse brake 32 have been released, each of the forward clutch 31 and the reverse brake 32 inevitably has some friction contact surfaces which are a part of plate friction surfaces of the forward clutch 31 or the reverse brake 32 and which are not completely separated off and thereby remain in contact with each other. Hence, the drag torque is caused. Hereinafter, for purpose of explanations, a condition is given by (drag torque of the forward clutch 31)>(drag torque of the reverse brake 32).

Figure 6:
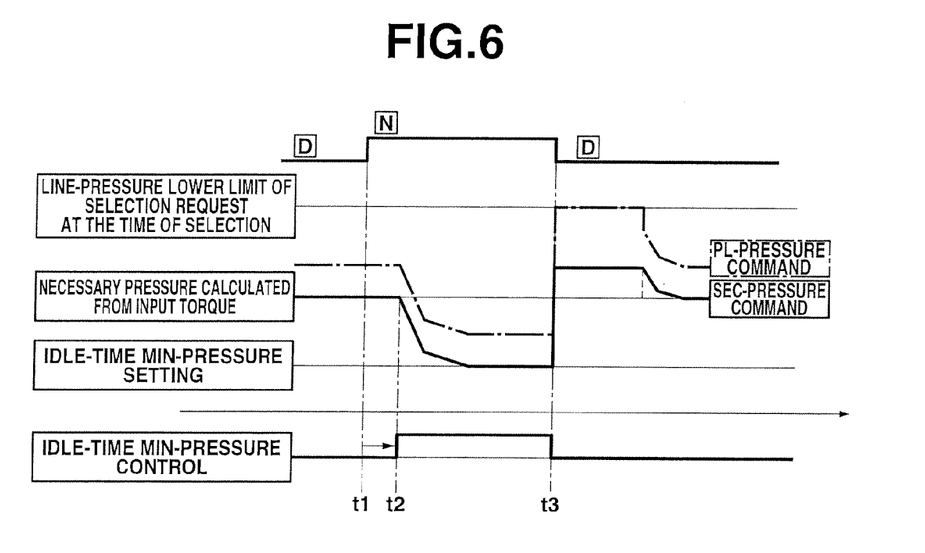
FIG. 6 A time chart showing characteristics of a range position, a line-pressure (PL) command, a secondary-pressure (SEC) command and a flag of idle-time minimum pressure control, in the case that a selecting manipulation D→N→D is conducted in a vehicle configured to execute a selection control of a comparative example.

Contrary to this, as shown by a secondary-pressure command characteristic in the comparative example of FIG. 6, the selecting manipulation from D-range to N-range is conducted at time point t1, and then, the idle-time minimum pressure (=idle-time MIN-pressure) is set from time point t2 at which the delay time Δt has just elapsed to time point t3 at which the selecting manipulation from N-range to D-range is conducted. The following was discovered by the inventors of the present application. That is, in the comparative example, drag torque derived from the forward clutch 31 is larger than a clamping force of the sheave surfaces 43c and 43d of the secondary pulley 43 against the elements 44b because the secondary pressure Psec is set at the idle-time minimum pressure when N-range is in a selected state. Accordingly, a clearance (backlash) of the elements is moved toward D-side to enlarge the backlash in D-side by the drag torque derived from the forward clutch 31 when the selecting manipulation D→N is conducted. On the other hand, a clearance (backlash) of the elements is moved toward D-side to reduce the backlash in R-side by the drag torque derived from the forward clutch 31 when the selecting manipulation R→N is conducted. In this case, if the reduction of the backlash in R-side progresses, a backlash is produced in D-side.

That is, in the case that the selecting manipulation D→N→R or R→N→D is conducted in the comparative example, the following results are obtained if the selection control is performed by a clutch pressure control for suppressing a rise of the input torque at the time of vehicle restart in order to suppress an occurrence of the backlash shock due to the belt counterturn.

(Selecting Manipulation D→N→R)

Because the backlash further moves toward D-side during N-range, an amount of the backlash becomes larger than expected although the backlash exists in an expected position (D-side). Hence, even if the clutch pressure control is performed based on the expected backlash amount in D-side, there is a risk that the occurrence of backlash shock cannot be suppressed as expected.

(Selecting Manipulation R→N→D)

Because the backlash moves toward D-side during N-range, the backlash does not exist in an expected position (R-side), and an amount of the backlash becomes smaller than expected. Accordingly, the problem of backlash shock is not caused even if an engaging time (time for engagement) is short. However, the engaging time is elongated by the clutch pressure control, so that a lag time until a completion of engagement is long.

Moreover, in the case that the selecting manipulation D→N→D or R→N→R is conducted in the comparative example, the following results are obtained if a clutch pressure control that quickly rises the input torque at the time of vehicle restart is performed.

(Selecting Manipulation D→N→D)

D-range is selected under a condition that the backlash has moved toward D-side during N-range. Hence, an expected performance can be attained without the backlash shock.

(Selecting Manipulation R→N→R)

Because the backlash moves toward D-side during N-range, the backlash does not exist in the expected position (R-side), and instead, a backlash is produced in the unexpected position (D-side). Hence, the backlash shock occurs although the selecting manipulation R→N→R unaccompanied by the belt counterturn.

As explained above, the (initial) position of the backlash is determined depending on whether D-range or R-range was selected just before the selection of N-range. Normally, by recognizing that this backlash exists in the expected position (R-side in the case of R→N, D-side in the case of D→N), the selection control is performed. However, higher one of the drag torque of the forward clutch 31 and the drag torque of the reverse brake 32 is inputted during the selection of N-range, and thereby, there is a possibility that the backlash moves toward the side (D-side in the case of R→N, R-side in the case of D→N) different from the expectation. As a result, an aimed performance cannot be attained when the selection control whose content is chosen based on the recognition that the backlash exists in the expected position is performed.

[Selection control operations at the time of running range→non-running range]

When the selecting manipulation D→N or the selecting manipulation R→N is done, the program proceeds as step S1→step S2→step S3 in the flowchart of FIG. 4. At step S3, the program waits until the delay time has just elapsed. Then, when the delay time has elapsed, the program proceeds as step S3→step S4→step S5. The process flow of step S4→step S5 is repeated until the selecting manipulation N→D or the selecting manipulation N→R is conducted. At step S4, a pulley hydraulic command to obtain the idle-time clamping pressure which is higher than the idle-time minimum pressure (=idle-time MIN-pressure) calculated from the input torque is outputted to the hydraulic control circuit 71.

That is, when the selecting manipulation from the running range (D-range, R-range) to the non-running range (N-range) is conducted, a pulley hydraulic pressure is brought to the idle-time clamping pressure which is higher than the idle-time minimum pressure. Therefore, the clamping force for the belt 44 by the secondary pulley 43 is secured during the selection of N-range.

Figure 7:
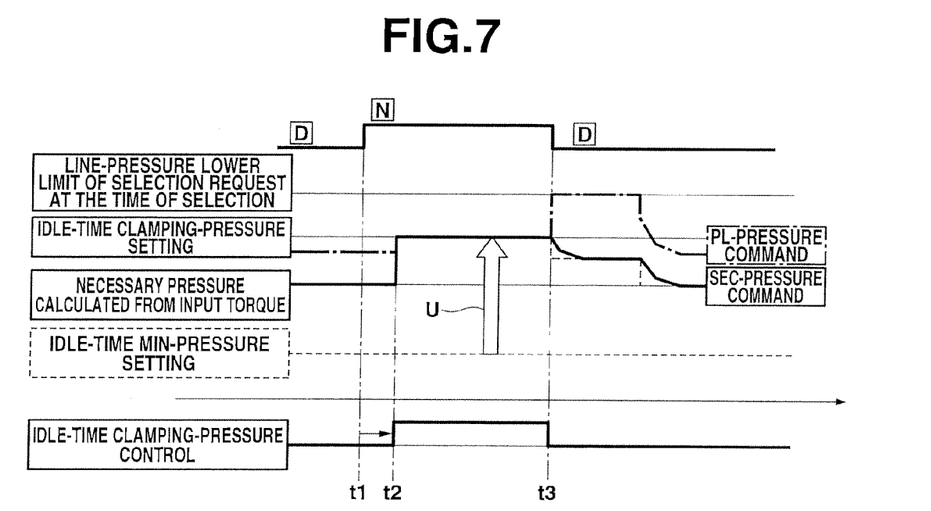
FIG. 7 A time chart showing characteristics of the range position, the line-pressure (PL) command, the secondary-pressure (SEC) command and a flag of idle-time minimum pressure control, in the case that the selecting manipulation D→N→D is conducted in the vehicle configured to execute the selection control of the first embodiment.

As shown by a secondary-pressure command characteristic of FIG. 7 in the first embodiment, the selecting manipulation from D-range to N-range is conducted at time point t1, and then, the idle-time clamping pressure (>idle-time MIN-pressure) is set from time point t2 at which the delay time Δt has just elapsed to time point t3 at which the selecting manipulation from N-range to D-range is conducted. Hence, as shown by an arrow U of FIG. 7, the belt clamping force by the secondary pulley 43 is enhanced because the secondary-pressure command is higher than the secondary-pressure command of the comparative example. Accordingly, the elements 44b of the belt 44 are inhibited from moving in dependence upon magnitude and direction of the drag torque inputted during the selection of N-range.

As a result, in the case that the selecting manipulation from D-range to N-range is conducted, the element clearance existing in the expected position (backlash existing in D-side) can be maintained even if there is the input of drag torque, during the selection of N-range. Similarly, in the case that the selecting manipulation from R-range to N-range is conducted, the element clearance existing in the expected position (backlash existing in R-side) can be maintained even if there is the input of drag torque, during the selection of N-range.

In the first embodiment, the idle-time clamping pressure (secondary pressure Psec) is set such that the belt clamping force which holds the elements 44b of the belt 44 on the sheave surfaces 43c and 43d of the secondary pulley 43 is greater than the drag torque of the forward clutch 31 included in the forward/reverse switching mechanism 3. By this setting, even if the drag torque is inputted from the forward clutch 31 while N-range is selected, the elements 44b of the belt 44 do not move by the torque input and are maintained on the heave surfaces 43c and 43d of the secondary pulley 43.

Therefore, the element clearance (backlash) can be fixed in the expected position (D-side in the case of D→N, R-side in the case of R→N) even if there is the input of drag torque, during the selection of N-range.

[Selection control operations at the time of running range→non-running range→running range]

When the selecting manipulation D→N→R or the selecting manipulation R→N→ID is done, the program proceeds as step S5→step S6→step S7 in the flowchart of FIG. 4. At step S7, the rise-rate suppressing control is performed to reduce the rise rate of the engaging hydraulic pressure by a friction-engagement-element pressure command having a low hydraulic-pressure setting as compared with the case of the selecting manipulation R→N→R or the selecting manipulation D→N→D.

In the case that the selecting manipulation D→N→R or the selecting manipulation R→N→D is conducted, the belt 44 rotates in the counter direction in the state where the backlash exists in the expected position according to the running range selected just before N-range, by the idle-time clamping-pressure control under N-range. Hence, in this mode, the backlash shock occurs. Therefore, the clutch hydraulic pressure is set at a low level as compared with the mode in which there is no rotation counterturn of the belt 44 such as the case of the selecting manipulation D→N→D or the selecting manipulation R→N→R. Thus, the selection control is performed by the clutch pressure control that suppresses the rise of torque inputted to the belt-type continuously-variable transmitting mechanism 4 at the time of vehicle restart.

Figure 8:
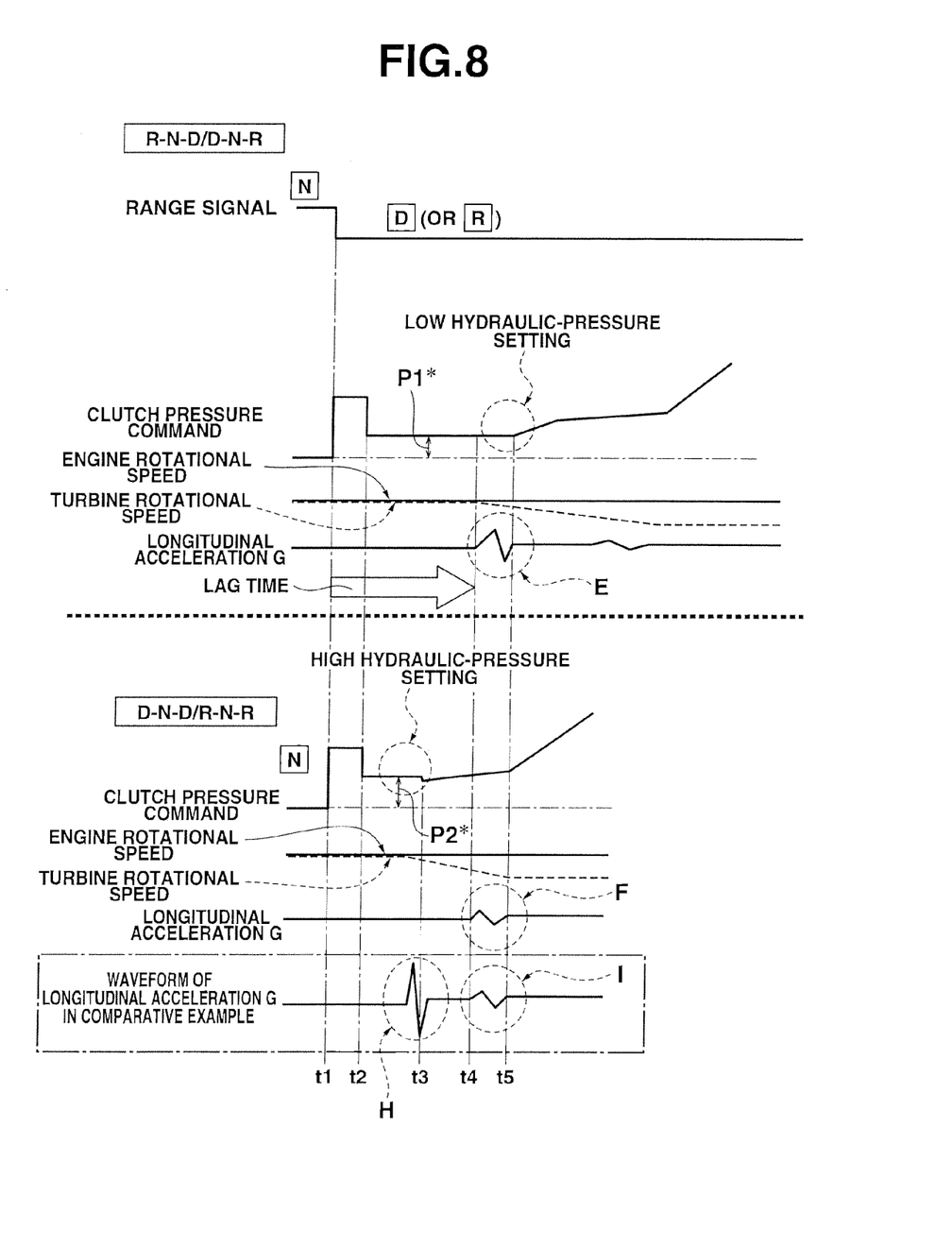
FIG. 8 A time chart showing characteristics of a clutch pressure command, an engine rotational speed, a turbine rotational speed and a longitudinal acceleration G, by a low hydraulic-pressure setting in the case that the selecting manipulation D→N→R or R→N→D is conducted and characteristics of the clutch pressure command, the engine rotational speed, the turbine rotational speed and the longitudinal acceleration G by a high hydraulic-pressure setting in the case that the selecting manipulation D→N→D or R→N→R is conducted in the vehicle configured to execute the selection control of the first embodiment, and showing a characteristic of waveform of the longitudinal acceleration G in the case that the selecting manipulation R→N→R is conducted in the comparative example.

That is, as shown by a clutch-pressure command characteristic in an upper portion of FIG. 8, a backlash-reducing initial pressure is applied from time point t1 at which the selecting manipulation N→R or the selecting manipulation N→D is conducted to time point t2. Then, from time point t2 to time point t5, a low clutch-pressure command P1* is maintained at a constant level. Thus, torque which is inputted to the belt-type continuously-variable transmitting mechanism 4 is suppressed after the selecting manipulation to the running range. As a result, in the case of the selecting manipulation D→N→R or R→N→D, the backlash shock having a suppressed fluctuation level of longitudinal acceleration (front-rear acceleration) G occurs at time point t4 at which the lag time has elapsed from time point t1 at which the selecting manipulation to the running range is conducted, as shown by an arrow E of FIG. 8. After the backlash shock occurs, the clutch is engaged. However, a clutch engagement shock is suppressed to a degree at which a driver does not receive information of this clutch engagement because the rise-rate suppressing control that causes the rise rate of the clutch-engaging hydraulic pressure to be low is performed in this case.

On the other hand, when the selecting manipulation D→N→D or the selecting manipulation R→N→R is done, the program proceeds as step S5→step S6→step S8 in the flowchart of FIG. 4. At step S8, the engaging control is performed to cause the rise rate of the engaging hydraulic pressure to be normal by a friction-engagement-element pressure command having a high hydraulic-pressure setting as compared with the case of the selecting manipulation R→N→D or the selecting manipulation D→N→R.

In the case that the selecting manipulation D→N D or the selecting manipulation R→N→R is conducted, the forward clutch 31 or the reverse brake 32 which produces the same running direction between before and after N-range is engaged without the rotation counterturn of the belt 44. In this mode, the backlash exists in the expected direction by the idle-time clamping-pressure control under N-range. Hence, only the engagement shock occurs. Therefore, the selection control by the clutch pressure control is performed such that the forward clutch 31 or the reverse brake 32 is engaged by a high engaging hydraulic pressure to increase the input torque to the belt-type continuously-variable transmitting mechanism 4 at the time of vehicle restart.

That is, as shown by a clutch-pressure command characteristic in a lower portion of FIG. 8, the backlash-reducing initial pressure is applied from time point t1 at which the selecting manipulation N→R or the selecting manipulation ND is conducted to time point t2. Then, from time point t2 to time point t3, a high clutch-pressure command P2* is maintained at a constant level. Thus, torque which is inputted to the belt-type continuously-variable transmitting mechanism 4 after the selecting manipulation to the running range is enlarged. As a result, in the case of the selecting manipulation D→N→D or R→N→R, a clutch pressure characteristic is determined in such a manner that the engagement shock occurs at time point t4 at which the lag time has elapsed from time point t1 at which the selecting manipulation to the running range is conducted, as shown by an arrow F of FIG. 8. That is, the lag time that causes the backlash shock (i.e. the lag time after which the backlash shock occurs) in the case of the selecting manipulation D→N→R or the selecting manipulation R→N→D is substantially equal to the lag time that causes the engagement shock in the case of the selecting manipulation D→ND or the selecting manipulation R→N→R.

It is noted that the clutch pressure is established in such a manner that the lag time that causes the backlash shock in the case of the selecting manipulation D→N→R or R→N→D is substantially equal to the lag time that causes the engagement shock in the case of the selecting manipulation D→N→D or R→N→R, based on specifications of friction elements, experimental results and the like.

In the case that the selecting manipulation R→N→R is conducted in the comparative example, as shown by a waveform of longitudinal acceleration in a lowest portion of FIG. 8, a backlash shock (arrow H of FIG. 8) occurs due to an unexpected backlash generated by the backlash movement toward D-side during N-range, in addition to an engagement shock (arrow I of FIG. 8).

Next, effects will now be explained.

The control device for a belt-type continuously variable transmission CVT according to the first embodiment can achieve the following listed effects.

(1) The control device comprises the drive source (engine 1);
the belt-type continuously-variable transmitting mechanism 4 including the primary pulley 42, the secondary pulley 43, and the belt 44 wound on the sheave surfaces 42c, 42d, 43c and 43d of both the primary and secondary pulleys 42 and 43 and constituted by stacking the multiple elements 44b in an annular shape;
the forward/reverse switching mechanism 3 provided between the drive source (engine 1) and the belt-type continuously-variable transmitting mechanism 4, configured to switch the transmission-input rotational direction by engaging the forward-side friction engagement element (forward clutch 31) when the range position is the forward running range (D-range) and by engaging the reverse-side friction engagement element (reverse brake 32) when the range position is the reverse running range (R-range), and configured to release both the friction engagement elements (forward clutch 31, reverse brake 32) when the range position is the non-running range (N-range);
the hydraulic control circuit 71 configured to control the pulley hydraulic pressures for the primary pulley 42 and the secondary pulley 43 and the engagement-element pressures for the forward-side friction engagement element (forward clutch 31) and the reverse-side friction engagement element (reverse brake 32); and
the selection control means (FIG. 4) for outputting a pulley hydraulic command to obtain the idle-time clamping pressure which is higher than the idle-time minimum pressure calculated from the input torque, to the hydraulic control circuit 71, when the drive source (engine 1) is in operation during the selection of the non-running range (N-range).

Accordingly, when the drive source (engine 1) is in operation during the selection of the non-running range (N-range), the position of the element clearance (backlash) existing in the belt 44 can be maintained even if the drag torque is inputted.

(2) The selection control means (FIG. 4) sets the idle-time clamping pressure such that the belt clamping force which maintains the elements 44b of the belt 44 on the sheave surfaces 43c and 43d is larger than the drag torque which is generated in the forward/reverse switching mechanism 3. (see FIG. 7)

Accordingly, in addition to the effects of Item (1), the element clearance (backlash) can be maintained in its initial position which existed when the non-running range (N-range) was selected, even if the drag torque is inputted when the non-running range (N-range) is in the selected state.

(3) The selection control means (FIG. 4) detects the selecting manipulation from the non-running range (N-range) to the running range (D-range, R-range), and the selection control means (FIG. 4) outputs the friction-engagement-element pressure command to the hydraulic control circuit 71 such that the friction-engagement-element pressure (forward clutch pressure Pfc or reverse brake pressure Prb) for the friction engagement element (forward clutch 31 or reverse brake 32) which is engaged by the selecting manipulation to the running range (D-range, R-range) in the case that the running ranges before and after the non-running range (N-range) have different directions from each other is lower than that in the case that the running ranges before and after the non-running range (N-range) have an identical direction.

Accordingly, in addition to the effects of Item (1) or Item (2), the occurrence of backlash shock can be suppressed with a targeted performance in the selection mode in which the rotational direction of the belt 44 is inversely changed, because the belt 44 starts to rotate in the counter direction from a state where the backlash exists in the expected direction.

(4) The selection control means (FIG. 4) sets the friction-engagement-element pressure command such that the lag time from the selecting manipulation to the running range (D-range or R-range) to the occurrence of backlash shock in the case that the running ranges (D-range, R-range) before and after the non-running range (N-range) have different directions from each other is substantially equal to the lag time from the selecting manipulation to the running range (D-range or R-range) to the occurrence of engagement shock in the case that the running ranges (D-range, R-range) before and after the non-running range (N-range) have the identical direction.

Accordingly, in addition to the effects of Item (3), a timing at which the shock having a magnitude perceptive by a driver occurs is constant regardless of whether the running ranges (D-range, R-range) before and after the non-running range (N-range) have the identical direction or the different directions when the driver conducts any selecting manipulation. Therefore, a strangeness feeling can be prevented from being applied to the driver or a passenger at the time of selecting manipulation.

Although the control device for a belt-type continuously variable transmission according to the invention has been explained with reference to the first embodiment, concrete configurations according to the invention are not limited to the first embodiment described above. The above-described embodiment can be varied or modified in design as needed within scopes according to respective Claims.

For example, in the first embodiment, the control device according to the present invention is applied to the engine vehicle equipped with the belt-type continuously variable transmission. However, the control device according to the present invention is also applicable to a hybrid vehicle equipped with a belt-type continuously variable transmission. That is, the control device according to the present invention is applicable to a vehicle equipped with a belt-type continuously variable transmission in which a belt formed by stacking multiple elements in an annular shape is wound on sheave surfaces of primary and secondary pulleys.

The invention claimed is:

1. A control device for a belt-type continuously variable transmission, the control device comprising:
   a drive source;
   a belt-type continuously-variable transmitting mechanism including
      a primary pulley,
      a secondary pulley, and
      a belt wound on sheave surfaces of both the primary and secondary pulleys and formed by stacking multiple elements in an annular shape;
   a forward/reverse switching mechanism
      provided between the drive source and the belt-type continuously-variable transmitting mechanism,
      configured to switch a transmission-input rotational direction by engaging a forward-side friction engagement element when a range position is a forward running range and by engaging a reverse-side friction engagement element when the range position is a reverse running range, and
      configured to release both of the forward-side and reverse-side friction engagement elements when the range position is a non-running range;
   a hydraulic control circuit configured to control pulley hydraulic pressures for the primary pulley and the secondary pulley and engagement-element pressures for the forward-side friction engagement element and the reverse-side friction engagement element; and
   a selection control section configured to control the hydraulic control circuit to cause the pulley hydraulic pressure to be equal to an idle-time clamping pressure which is higher than an idle-time minimum pressure calculated from an input torque, when the drive source is in operation during a selection of the non-running range.

2. The control device according to claim 1, wherein the selection control section sets the idle-time clamping pressure such that a belt clamping force which maintains the elements of the belt on the sheave surfaces is larger than a drag torque which is generated in the forward/reverse switching mechanism.

3. The control device according to claim 1, wherein
   the selection control section detects a selecting manipulation from the non-running range to the running range, and
   the selection control section outputs a friction-engagement-element pressure command to the hydraulic control circuit such that the engagement-element pressure for the friction engagement element which is engaged by the selecting manipulation to the running range in a case that the running ranges before and after the non-running range have different directions from each other is lower than that in a case that the running ranges before and after the non-running range have an identical direction.

4. The control device according to claim 3, wherein
   the selection control section sets the friction-engagement-element pressure command such that a lag time from the selecting manipulation to the running range to an occurrence of backlash shock in the case that the running ranges before and after the non-running range have different directions from each other is substantially equal to a lag time from the selecting manipulation to the running range to an occurrence of engagement shock in the case that the running ranges before and after the non-running range have the identical direction.

* * * * *